A. WATHEY.
AIR DISTRIBUTING BOX FOR STOKERS.
APPLICATION FILED MAR. 26, 1921.
1,419,183.
Patented June 13, 1922.
2 SHEETS—SHEET 2.
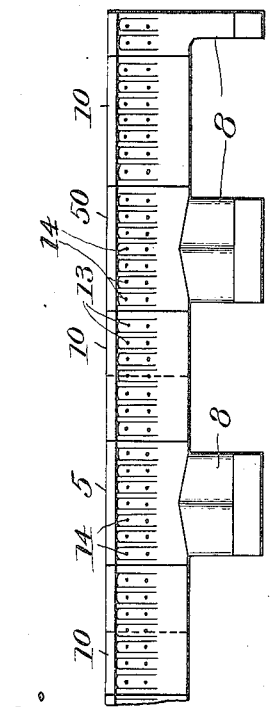
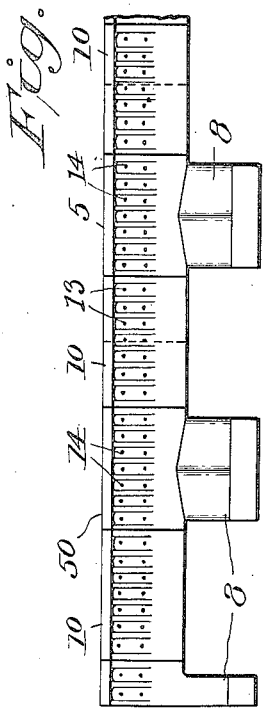
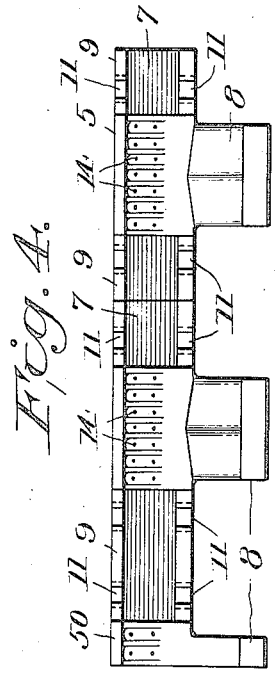
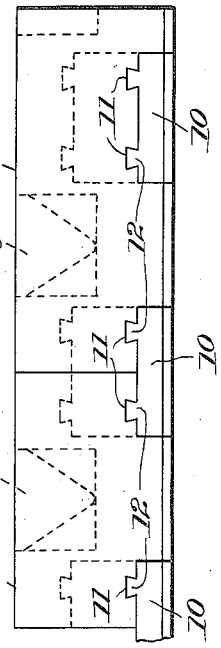
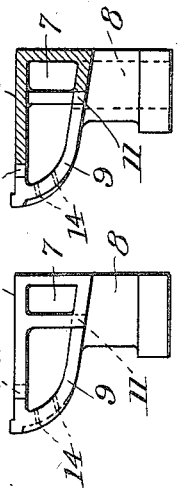
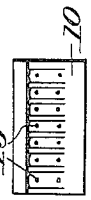
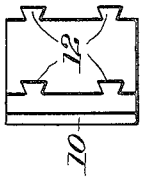
Inventor
Arthur Wathey,
By Geo. A. Hutchinson
Attorney

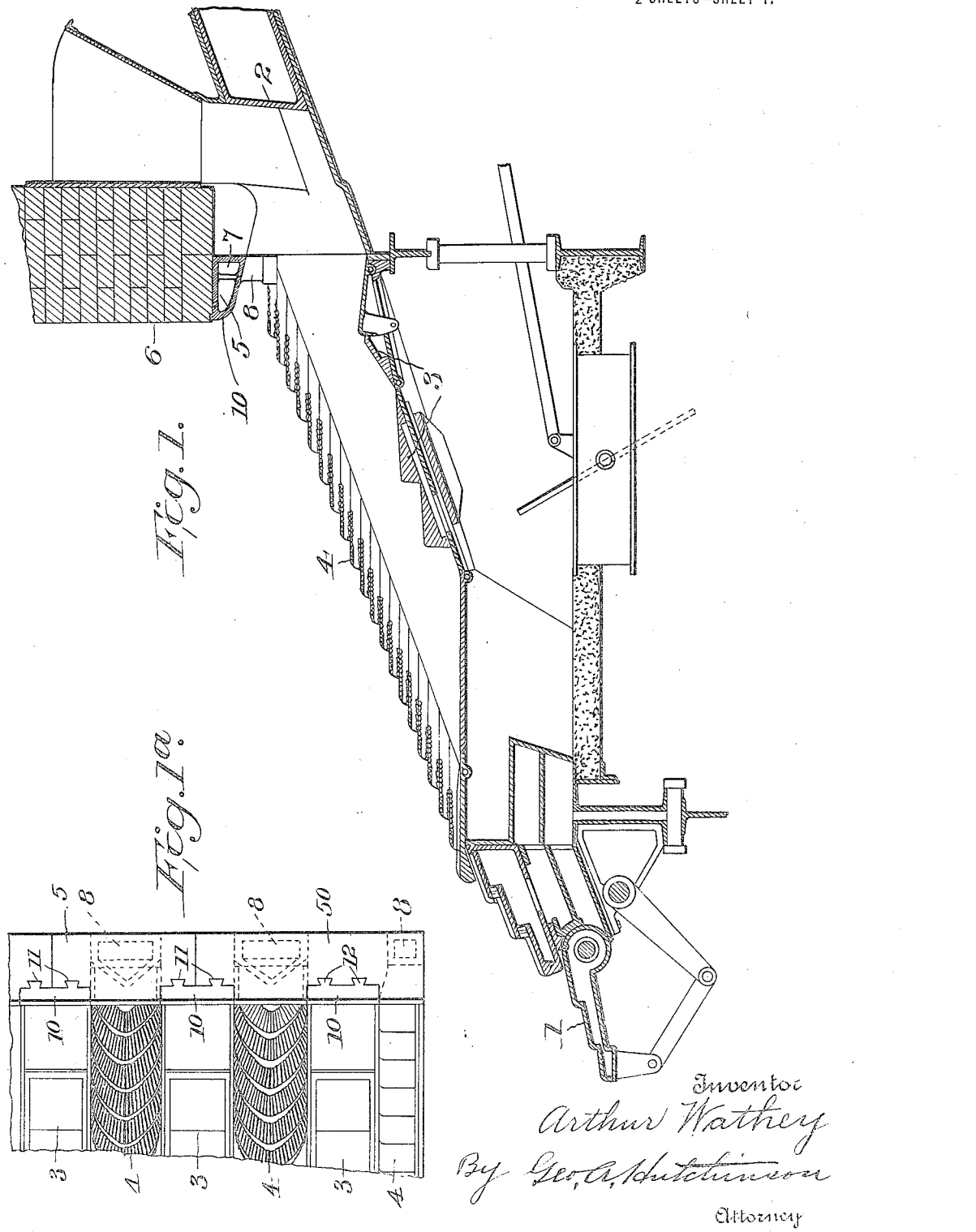

UNITED STATES PATENT OFFICE.

ARTHUR WATHEY, OF CLEVELAND, OHIO.

AIR-DISTRIBUTING BOX FOR STOKERS.

1,419,183.  Specification of Letters Patent.  Patented June 13, 1922.

Application filed March 26, 1921. Serial No. 455,815.

*To all whom it may concern:*

Be it known that I, ARTHUR WATHEY, a citizen of the United States, residing at Cleveland, in the county of Cuyahoga and State of Ohio, have invented certain new and useful Improvements in Air-Distributing Boxes for Stokers, of which the following is a full, clear, and exact specification.

This invention relates to air distributing boxes for use in connection with furnace stokers of the forced air or twyer type.

Experience has shown that the air distributing boxes used in connection with such stokers quickly burn out at the points between the twyers, making it necessary to tear down the brick wall above said boxes in order to renew the latter. The tearing down of this wall, the renewing of the air distributing box, and the rebuilding of said wall, which is necessary about once a month when any of the form of boxes heretofore used, involves considerable expense, often amounting to as much as $1200.00, as well as necessitating the shutting down of the furnace while the repair work is being done.

It is the aim of the present invention to avoid these frequent and expensive repairs to the air distributing box, thereby greatly reducing the cost of maintaining the furnace in running order and permitting it to be almost constantly operated with fewer interruptions for such repairs. To this end, the invention consists in forming the air distributing box with renewable portions at the points between the ducts leading to the twyers where the burning out occurs, so that when said renewable portions are burned out, they may be quickly replaced by new portions at comparatively small expense.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:

Figure 1 is a sectional view of a portion of a stoker of the forced air or twyer type, showing the location of the air distributing box transversely to the upper ends of the twyers.

Figure 1ª is a fragmentary plan view of the upper end portions of a plurality of the twyers, showing their connections to the air distributing box, the wall over said box being omitted to show the latter.

Figure 2 is a broken rear elevation of the air distributing box as it appears when assembled with the renewable portions thereof.

Figure 3 is a top plan view of one of the end sections of the air distributing box and one of the intermediate sections thereof assembled with the renewable portions thereof, as shown in the right hand portion of Figure 2.

Figure 4 is a rear elevation of one of the end sections of the air distributing box and the adjacent intermediate section thereof assembled, as shown in the left hand portion of Figure 2, but with the renewable portions removed.

Figure 5 is an end view of one of the intermediate sections of the air distributing box.

Figure 6 is a section through one of said intermediate sections of the air distributing box taken vertically through one of the spaces for a renewable portion, the latter being removed.

Figure 7 is a detailed end view of one of said renewable portions.

Figure 8 is a rear elevation of the same, and

Figure 9 is a plan view thereof.

In Figure 1, 1 designates a portion of a furnace grate, while 2 indicates the reciprocating fuel pushers, 3 the fuel feeding wedges in the fuel retorts alternating with the twyers or twyer boxes, and 4 the twyers of a forced air stoker. As is well understood in this art, the forced air is supplied to said twyers 4 by a distributing box 5 which extends transversely above of the upper ends of said twyers and is located below the furnace wall 6. Said air distributing box 5 is usually made in a plurality of sections fitting end to end and extending entirely across the stoker below said wall 6. Each of said sections is provided with a longitudinal air passage communicating with those of the adjacent sections, and also with one or more downwardly extending air ducts leading to the twyers 4. The front portions of these sections, between said downwardly extending air ducts which lead to the twyers, are the parts which quickly burn out as they are subjected to the greatest heat.

As best illustrated in Figures 2 to 9, inclusive, the intermediate sections of the air distributing box 5 and end sections 50 of the present invention have the communicating longitudinally extending air passages 7, and the downwardly extending air ducts 8 leading to the twyers. The front portions or walls of said sections are cut away at 9 between said air ducts 8, and renewable portions or plates 10 are provided to fill in said cut-away portions 9, so that when said plates 10 are burned out, they may be replaced with similar plates without necessitating the removal and replacing of the air distributing box as a whole. The replacing of said renewable plates 10 necessitates the removal of only two bricks from the bottom of the wall 6 immediately above the air distributing box, which requires very little time and involves small expense as compared with the tearing down of the entire wall when prior forms of air distributing boxes have to be replaced, as hereinbefore explained.

The upper and lower margins of the cut-away portions 9 are formed with vertically extending dove-tailed notches 11 into which corresponding dove-tailed tongues 12 on the renewable plates 10 are adapted to fit for retaining said plates in place, as best shown in Figures 2 and 3. It will be noted in Figures 2, 3 and 4 that the cut-away portions 9 between the downwardly extending air ducts 8 of adjacent sections extend across the ends of said sections, and that the plates 10 when fitted in said cut-away portions also serve to interlock or connect the sections by reason of the dove-tailed tongues 12 on said plates engaging the dove-tailed grooves 11 in the adjacent ends of said sections. The plates 10 are preferably provided with air discharging openings 13 at intervals throughout their length, and the integral rear portions of the air distributing box between said renewable plates 10 are also preferably perforated at 14 in a similar manner.

It has been found that the air distributing box, when made in accordance with the present invention, with renewable portions or plates at the points indicated, will last for three or four years, said plates being replaced at necessary intervals, whereas with any of the prior forms of air distributing boxes, not having renewable portions or plates, it is necessary to replace the entire box about once a month when the portions between the vertical air ducts burn out. The great saving in time and expense incident to the use of the present form of air distributing box has been hereinbefore explained.

I claim:

1. In an underfeed stoker comprising a plurality of alternately arranged fuel retorts and twyer boxes, an air box arranged transversely of said retorts and twyer boxes and above the same, and having ducts leading to said twyer boxes, said air box comprising a plurality of sections arranged end to end and meeting above the retorts, there being removable wall portions of said air box arranged above the retorts and overlapping the meeting ends of said sections.

2. In an underfeed stoker comprising a plurality of alternately arranged fuel retorts and twyer boxes, an air box arranged transversely of said retorts and twyer boxes and above the same, and having ducts leading to said twyer boxes, said air box comprising a plurality of sections arranged end to end and meeting above the retorts, there being removable wall portions of said air box arranged above the retorts and overlapping the meeting ends of said sections, said removable wall portions having interlocking connections with said sections for the purpose specified.

In testimony whereof I have signed my name to this specification.

ARTHUR WATHEY.